United States Patent Office 3,566,707
Patented Mar. 2, 1971

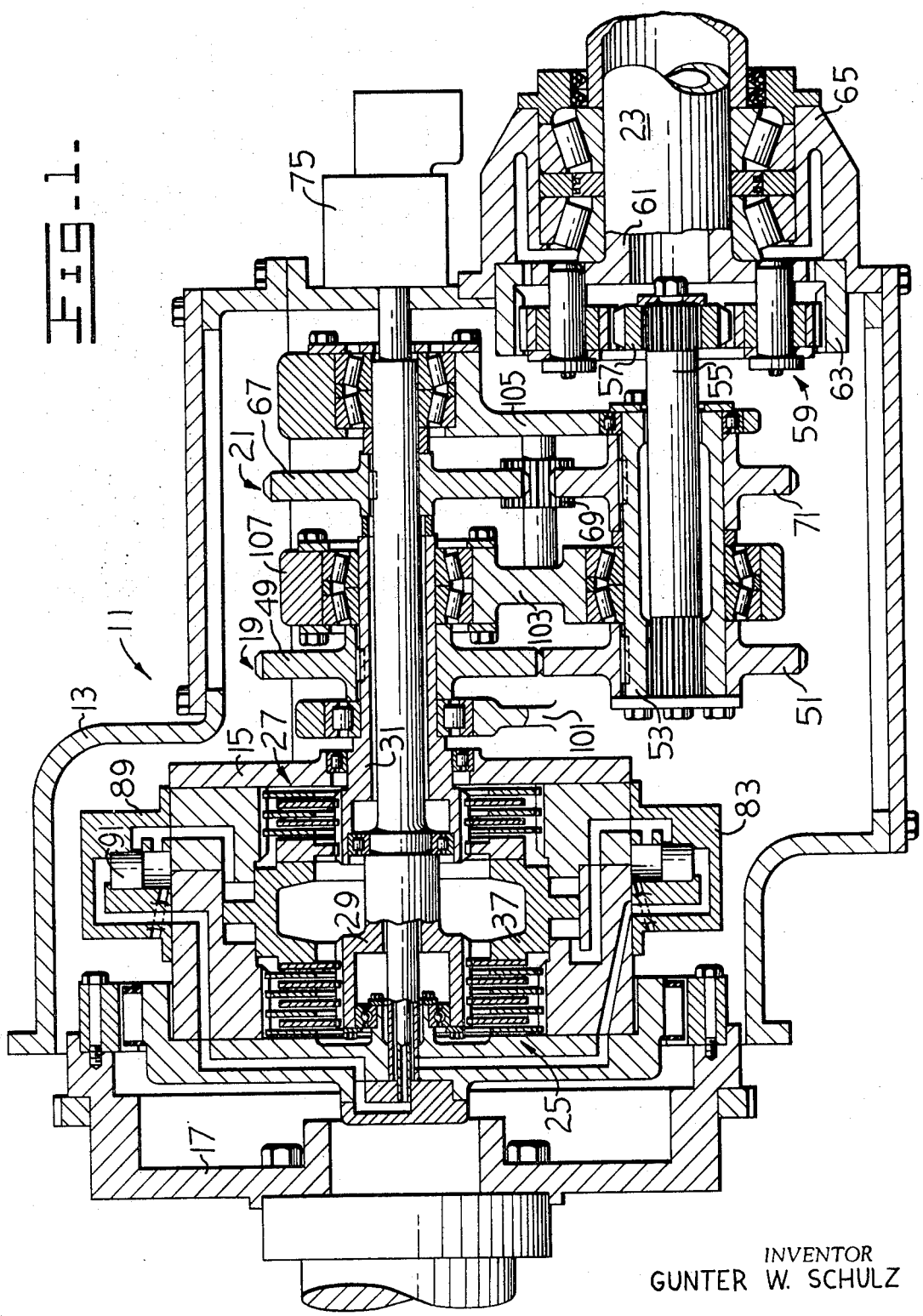

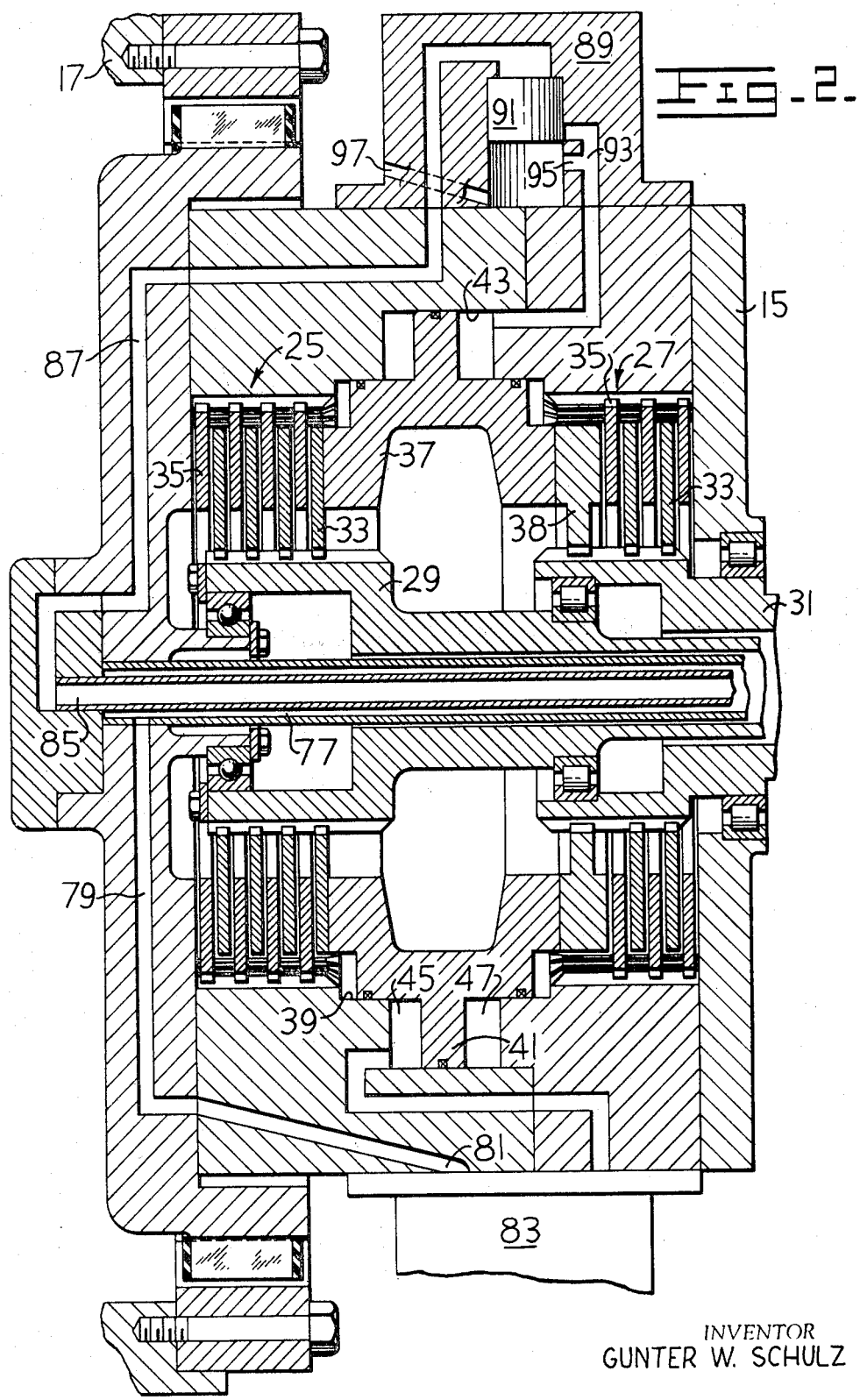

3,566,707
MARINE GEAR
Gunter W. Schulz, Peoria, Ill., assignor to
Caterpillar Tractor Co., Peoria, Ill.
Filed Dec. 12, 1968, Ser. No. 783,358
Int. Cl. F16h 3/14; F16d 25/10
U.S. Cl. 74—377                    4 Claims

ABSTRACT OF THE DISCLOSURE

A marine gear having a clutch actuating piston-actuator which is free to rotate within the housing until complete engagement is achieved at which time the housing, piston, and engaged clutch all rotate as a unit. The various shaft bearing support members are secured to the housing of the marine gear so that the shafts may be easily removed with the gears contained thereon to convert the marine gear from one reduction ratio to another, as well as to convert the clutch packs to various torque requirements. A clutch dump valve is contained in a separate housing which is bolted to the clutch housing.

SUMMARY OF THE INVENTION

This invention relates to the design of a marine gear, and more particularly to an improved clutch actuation system within such a gear.

The design in this invention provides a unit which is more easily serviced and manufactured as well as more easily adapted to accommodate several horsepower ranges then the marine gears presently available.

A serious problem encountered in present day marine gears is that of the shock loading of the clutch during initial engagement. This is caused by the piston-actuator being secured to the housing and results in shock loading of the entire drive train.

Although marine gears are designed to allow the reduction gears to be changed to provide different gears ratios, the changeover is very difficult due to the necessity of removing the entire upper half of the case, including bearings, etc., to remove the shaft, gears, and bearings.

Additionally, although many marine gears utilize clutch dump valves, such valves are for the most part an integral part of the center sections of the clutch housing. Since than portion requires critical tolerances, the housings have a high scrap rate due to the final operation in their manufacture.

One of the features of the invention which solves a series problem is that of an improved clutch piston-actuator which is free to rotate in the housing. Upon engagement of the clutch, the actuator will slip for several revolutions until complete engagement is achieved, at which time the housing, actuator, and engaged clutch all rotate as a unit. This slippage of the actuator effects an even, smooth loading of the clutch plates, thereby minimizing shock loading.

Another feature of the subject invention is the method of securing the bearings which rotatably support the various shafts. By securing the support members to the side walls of the marine gear housing as an integral part of the housing, the shaft and gears may be easily removed as a single unit to convert the marine gear from one reduction ratio to another. Further, this arrangement allows as easy conversion of the clutch packs for various torque requirements.

It is therefore an object of this invention to provide a marine gear which is vastly improved in operations, while less expensive to produce, than most gears now known.

It is also an object of this invention to provide a marine gear wherein there is no shock loading of the clutch during engagement thereof.

It is also an object of this invention to provide a marine gear having an improved clutch actuator-piston which is not fixed to the clutch-pack housing.

It is a further object of this invention to provide a marine gear which may easily be serviced and manufactured and readily adapted to accommodate several horsepower ranges.

It is also an object of this invention to provide a marine gear having an improved and simplified means for changing the gear ratio thereof.

It is a further object of this invention to provide a marine gear having an improved and simplified system for converting the clutch-pack to accommodate various torque requirements.

It is a still further object of this invention to provide a marine gear having a clutch dump valve contained in a separate housing which may be mounted on the clutch-pack housing.

It is a still further object of this invention to provide a marine gear having improved serviceability and adaptability through the securing of the bearings by means of bearing caps.

It is also an object of this invention to provide a marine gear wherein the top portion of the gear housing can be removed without disturbing the bearings supporting the shafts.

Other objects and advantages of the present invention will become apparent from the following description and claims as illustrated in the accompanying drawings which, by way of illustration, show a preferred embodiment of the present invention and principles thereof and what is now considered to be the best mode contemplated for applying these principles. It is recognized that other embodiments of the invention utilizing the same or equivalent principles may be used, and structural changes may b made as desired by those skilled in the art, without departing from the present invention and purview of the appended claims.

BRIEF DESCRIPTION OF THE DRAWINGS

FIG. 1 is a schematic, sectional illustration of the marine gear of the present invention; and FIG. 2 is a schematic sectional illustration of the clutch-pack portion of the marine gear.

DETAILED DESCRIPTION

Referring now to the drawings in greater detail, a marine gear 11, having a housing 13, contains a clutch housing 15 secured to an engine flywheel 17. The flywheel is interconnected to an ahead and an astern drive train 19 and 21, respectively, which drive an output shaft 23 to which a propeller shaft (not shown) is attached.

As shown in FIG. 2, the astern clutch-pack 25 and the ahead clutch-pack 27, located within the housing 15, are mounted on an intershaft 29 and a quill shaft 31 respectively. Each clutch-pack is a multiple-disc type and consists of alternate steel plates 33, and metal lined discs 35. Although, in the drawing the clutches are not shown to have the same number of plates and discs, in an actual gear the sets would be equal. Here however, it has been shown, relative to clutch 27, how plates and discs may be replaced in either clutch by a wide spacer plate 38 so as to produce a system requiring lower torque. As stated however, in any one marine gear, both clutch-packs would be identical in size and number of plates.

An annular actuator 37, located in a bore 39 of the housing 15 between the astern and the ahead clutch-pack, has an outwardly extending flange 41 which is slidably contained in an annular groove 43 in the inner wall of the clutch housing. The flange 41 serves as a piston member to move the actuator 37 and has fluid cylinders or compartments 45 and 47 on either side thereof.

The ahead drive train 19 has a gear 49 which is keyed to the quill shaft 31 and meshes with a gear 51 keyed to a hollow shaft 53. A shaft 55, splined within shaft 53, carries a sun gear 57 of a planetary final drive reduction gear 59. A planetary carrier 61 is integrally formed with the output shaft 23, and a ring gear 63 is secured to cover 65, which is part of the marine gear housing 13.

The astern drive train 21 includes a gear 67 which is keyed to the intershaft 29 and meshes with an idler gear 69 which in turn meshes with a gear 71 keyed to the hollow shaft 53. The idler gear 69 causes the rotation of gear 71 to be reversed relative to the rotation of gear 51 thereby causing the output shaft 23 to be rotated in a reverse direction. A control valve 75 of any suitable type may be mounted on the housing 13. Upon actuation, the valve supplies fluid pressure to either compartment 45 or 47 to cause engagement of either the head or astern clutch.

To engage the ahead clutch, fluid is directed by the valve 75 through passages 77 and 79 into passage 81 of the ahead clutch dump valve 83 secured to the outside of the housing 15.

Actuation of the control valve 75 so as to operate the astern clutch directs fluid through passages 85 and 87 to the astern clutch dump valve 89. Since the clutch dump valves 83 and 89 are identical, and each is installed in its own housing which is mounted on the clutch-pack housing 15, only the operation of the astern dump valve 89 will be described here.

As shown in FIG. 2, the oil pressure in passage 87 acts against a dump valve piston 91, overcoming the centrifugal force caused by the rotation of the housing 15, and moves the piston inwardly. This inward movement opens a passage 93 to cause communication of passage 87 and cylinder 47; the fluid pressure exerted on piston 41 causes the actuator 37 to move to the left, as shown in the figures, causing engagement of the astern clutch-pack. Engagement of the clutch-pack 25 causes power to be transmitted from the housing 15, which is fixed to the flywheel 17, through the astern drive train 21, to the output shaft 23.

Shifting the control valve 75 to the neutral position results in the cutting off of the fluid pressure to the compartment 47. When this occurs, the dump valve piston 91 moves outwardly due to the centrifugal force, permitting the fluid in compartment 47 to exhaust through a port 95 and outlet passage 97 in the dump valve.

The clutch discs 35 are similar in shape to a Belleville spring and cause the discs 35 and plates 33 to separate, thereby disengaging the clutch.

As shown in FIG. 1, actuation of the control valve 75 to the forward position serves to deliver fluid to the opposite side of piston 41 and cause the engagement of clutch-pack 27, thereby delivering power to forward drive train 19 for delivery to output shaft 23 in the above described manner.

The bearing support members 101, 103, and 105 shown in FIG. 1 are secured to the lower side walls (not shown) of the marine gear housing as an integral part of the housing, and the bearings are secured to the support members by bearing caps such as 107 which are similar to those bearing caps used to secure an engine crank shaft to its block. This type of mounting allows the upper portion of the marine gear housing 13 to be assembled or disassembled without disturbing the bearings, and also allows the various shafts to be quickly and easily replaced so as to convert from one gear reduction ratio to another, as well as to convert from one clutch-pack to another to accommodate various torque requirements.

Thus the applicant has provided a marine gear which is capable of relatively inexpensive production and maintenance and which may be easily converted from one gear ratio to another and one torque output capacity to another. While illustrated and described as a single preferred embodiment, the invention is capable of variation and modification within the purview of the following claims in many ways which will be obvious to those skilled in the art.

What is claimed is:

1. In a drive gear mechanism, a flywheel fixed to a rotatable clutch housing, said flywheel being mounted for rotation about a longitudinal axis, said clutch defining an axially-oriented inner wall and containing an astern clutch mounted on an intershaft and an ahead clutch mounted on a quill shaft, said clutches being located radially inward of said inner wall, an ahead drive train driven by said quill shaft and an astern drive train driven by said intershaft, a clutch actuating means in the form of a single annular actuator, defining a radially outermost axially-oriented surface, located between said ahead and astern clutches in said clutch housing and being freely rotatable relative thereto as well as being adapted for longitudinal movement wherein said single annular actuator alternatively actuates said ahead and astern clutch, a single annular groove in the inner wall of said clutch housing between said ahead and astern clutches, said groove being located radially outward of said inner wall and said clutches, said groove defining at its radially outermost portion an axially-oriented wall, said groove further defining a pair of radial walls extending radially inward from said axially-oriented wall, said groove being of an axial width less than width of the axially-oriented surface of said single annular actuator, and piston means on said single annular actuator having a plurality of piston surfaces for fluid actuation of said single annular actuator, said piston means comprising a single radial flange on the axially-oriented surface of said single annular actuator defining a pair of radially outwardly extending surfaces joined by an axially-oriented surface, said single radial flange extending into said groove with said radially outwardly extending surfaces of said flange being in spaced relation to said radial walls and said axially-oriented surface of said single radial flange cooperating with said axially-oriented groove wall, and said axially oriented surface of said single annular actuator cooperating with the inner wall of said clutch housing on both sides of said groove thereby defining a pair of fluid cylinders in said groove on each side of said single radial flange, said pair of fluid cylinders being formed by the radially outwardly extending surfaces of said single radial flange, said radially and axially-oriented groove walls, and said axially-oriented surface of said single annular actuator, and wherein said single annular actuator forms a unitary, one-piece construction with said single radial flange, and a pair of dump valve housings mounted on said clutch housing, said dump valve housings being located radially outward of said groove, each of said dump valve housings having a valve piston therein, fluid passage means in said valve housings normally closed by said valve pistons when said flywheel is rotating, and means in said valve housings delivering fluid to said valve pistons, thereby opening said fluid passage means to pass the fluid to one of said piston surfaces on said clutch actuating means.

2. The drive gear of claim 1 including fluid passage means in said valve housings normally open when said flywheel is rotating, whereby the fluid pressure at the piston surfaces is relieved.

3. The drive gear of claim 1 wherein the quill shaft, intershaft, and the shafts of said drive trains are mounted on bearing support members which are secured to said housing.

4. The drive gear of claim 3 wherein said shafts are held on said bearing supports by bearing caps secured to said supports.

References Cited

UNITED STATES PATENTS

| | | | |
|---|---|---|---|
| 1,141,544 | 6/1915 | Helander et al. | 308—74 |
| 2,406,417 | 8/1946 | Viviano | 192—87.17 |
| 2,669,881 | 2/1954 | Skidmore | 74—325X |
| 2,728,241 | 12/1955 | Lucia | 74—330X |
| 2,841,023 | 7/1958 | Gorshkoff | 74—377 |
| 2,916,930 | 12/1959 | Gorshkoff et al. | 74—377 |
| 2,938,652 | 5/1960 | Polzin | 308—74X |
| 2,416,154 | 2/1947 | Chilton | 192—87.17X |

MARK M. NEWMAN, Primary Examiner

THOMAS C. PERRY, Assistant Examiner

U.S. Cl. X.R.

74—325; 192—87.17